H. A. GOULD & E. C. MOSSHOLDER.
CHECK VALVE.
APPLICATION FILED MAR. 31, 1917.

1,260,663.

Patented Mar. 26, 1918.

WITNESSES:

INVENTORS:—
Howard A. Gould.
Earl C. Mossholder.
BY Strong & Townsend
ATTORNEYS

UNITED STATES PATENT OFFICE.

HOWARD A. GOULD AND EARL C. MOSSHOLDER, OF PASADENA, CALIFORNIA.

CHECK-VALVE.

1,260,663. Specification of Letters Patent. Patented Mar. 26, 1918.

Application filed March 31, 1917. Serial No. 158,826.

*To all whom it may concern:*

Be it known that we, HOWARD A. GOULD and EARL C. MOSSHOLDER, citizens of the United States, residing at Pasadena, in the county of Los Angeles and State of California, have invented new and useful Improvements in Check-Valves, of which the following is a specification.

This invention relates to a check valve.

One of the objects of the present invention is to provide a simple, substantial, cheaply manufactured, efficient check valve adapted both for high or low pressure and suitable for use in connection with air, gas, water, steam, or any other liquid maintained under pressure, and which may be placed in a horizontal, vertical or any position desired. Another object of the invention is to provide a check valve comprising a casing which consists of two separable sections, between which is clamped a removable valve seat member of large area carrying a valve stem and a valve of the puppet type which is held against the seat by spring action and limited in movement, said valve seat member, together with the stem, spring and valve, being removable as a unit for adjustment, regrinding or renewal of parts. Further objects will hereinafter appear.

The invention consists of the parts and the construction and combination of parts as hereinafter more fully described and claimed, having reference to the accompanying drawings, in which—

Figure 1:
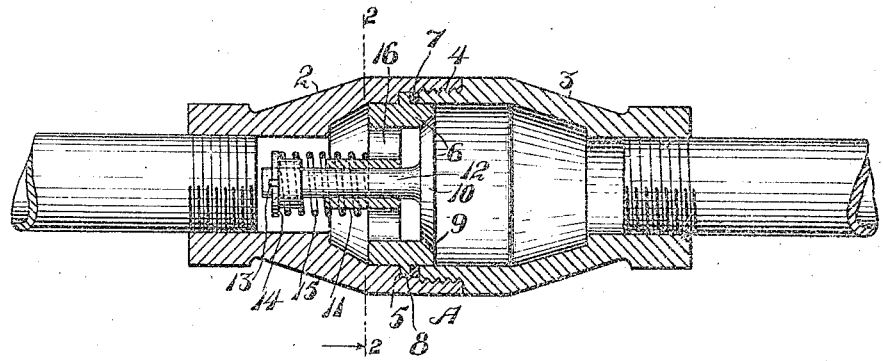
Figure 1 is a central, longitudinal section through the check valve.
Figure 2:
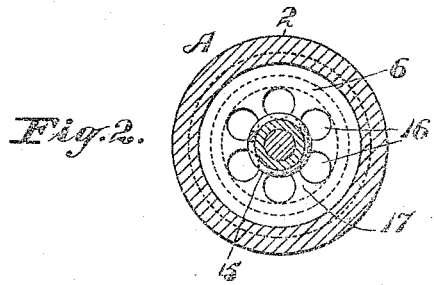
Fig. 2 is a cross section on line 2—2 of Fig. 1.

Referring to the drawings in detail, A indicates, in general, a casing which in this instance is divided into two sections 2 and 3 which may be secured together in any suitable manner, but preferably, as here shown, by providing internally and externally threaded sections 4. Formed interiorly of the casing section 2 is an annular seat 5, and adapted to be placed on said seat is a valve seat member 6 which is clamped between the two casing sections when these are screwed together; a lead gasket 7 or other suitable packing means being interposed to prevent leakage around the valve seat member.

The valve seat member in reality comprises a disk provided with an annular range 8 which engages the seat 5 and supports the packing gasket 7. One face of the disk is tapered, as at 9, to form a seat for a valve 10 of the mushroom type, while the center portion of the disk is provided with a central bearing extension 11 for the reception of a valve stem 12 carrying the valve 10. Secured on the outer end of the stem by means of a key 13, is a collar 14, and interposed between said collar and the front face of the disk is a spring 15 which normally holds the valve 10 on its seat. The space between the bearing extension 11 and the outer rim of the disk is provided with a circular arrangement of perforations 16 through which the incoming air must pass before escaping between the valve 10 and the tapering seat 9. The metal 17 left between the perforations 16 forms supporting arms for the central bearing 11 through which the valve stem passes and may also form supports for the inner end of the spring 15.

The valve seat member constructed as here shown permits the use of a valve of large area and also permits the employment of a valve of the puppet type which, when ground to a seat, practically prevents leakage even though comparatively high pressures are employed. The spring 15 also retains the valve on its seat where low pressures are encountered and leakage through the valve is therefore prevented under all conditions. The removable mounting of the valve seat member, together with the stem 12, valve 10 and spring 15, permits all the essential parts of the valve to be removed as a unit for adjustment, regrinding or renewal of any of the parts and as no wear takes place between the annular supporting shoulder 8 and the valve casing, it can readily be seen that a perfect alinement of the valve 10 with its seat is always maintained regardless of the position of the surrounding casing or any damage to which it may have been subjected.

The casing proper may be used as a union connection by employing a right and left-hand thread on either end of the casing, or it may be used as a coupling and a unit fitting. The collar 10 may be adjusted upon the stem to limit the lifting movement of the valve 10, thereby permitting a large valve opening and a quick seating under all conditions.

The materials and finish of the several parts of the check valve may be such as the experience and judgment of the manufacturer may dictate.

We wish it understood that various changes in form, proportions and details of construction may be resorted to within the scope of the appended claim and that we do not wish to limit ourselves to the specific design and construction here shown.

Having thus described our invention, what we claim and desire to secure by Letters Patent is—

In a check valve, a pair of hollow casing sections one of which has the interior of its end reduced in diameter to form a shoulder on its interior spaced from said end of the section, an apertured relatively thick integral disk having an annular flange between its ends, the inner diameter of the said section from said shoulder to the said adjacent casing end being larger than the diameter of said flange so as to allow the disk to be inserted in the casing and the flange seated against said shoulder, said section having a part between said shoulder and its opposite end to engage over the inner end of the disk periphery so as to support the disk, a spring pressed valve borne by the disk and a gasket surrounding said disk and abutting said flange, the other casing section having an end reduced exteriorly in diameter and formed on its inner circumference to engage over the periphery of the outer end of the disk and within said end of the first section and having its free end formed to force said gasket against said flange and the latter against the shoulder.

In testimony whereof we have hereunto set our hands in the presence of two subscribing witnesses.

HOWARD A. GOULD.
EARL C. MOSSHOLDER.

Witnesses:
ALBERT B. GOULD,
JOSEPH C. MOSSHOLDER.